A. SIMON.
CIRCUIT CONTROLLER.
APPLICATION FILED AUG. 30, 1915.

1,284,937.

Patented Nov. 12, 1918.

Inventor
Arthur Simon
By Frank A. Hubbard
Attorney

UNITED STATES PATENT OFFICE.

ARTHUR SIMON, OF MILWAUKEE, WISCONSIN, ASSIGNOR TO THE CUTLER-HAMMER MFG. CO., OF MILWAUKEE, WISCONSIN, A CORPORATION OF WISCONSIN.

CIRCUIT-CONTROLLER.

1,284,937.  Specification of Letters Patent.  Patented Nov. 12, 1918.

Application filed August 30, 1915. Serial No. 48,081.

*To all whom it may concern:*

Be it known that I, ARTHUR SIMON, a citizen of the United States, residing at Milwaukee, in the county of Milwaukee and State of Wisconsin, have invented new and useful Improvements in Circuit-Controllers, of which the following is a full, clear, concise, and exact description, reference being had to the accompanying drawing, forming a part of this specification.

This invention relates to improvements in circuit controllers. More particularly the invention relates to protective controllers of the type disclosed in my prior application Serial No. 36,765, filed June 28, 1915, wherein the circuit making and breaking means is under the control of a torque motor which detects abnormal conditions in the controlled circuit.

The present invention has among its objects to provide a simple, efficient and sensitive controlling mechanism of the aforesaid character which may be readily adjusted to meet different requirements.

A further object is to provide a controlling mechanism utilizing to advantage some of the heat generated by its governing motor and at the same time providing adequate ventilation of the motor to prevent excessive heating thereof.

A still further object is to combine the circuit-making and breaking means and the governing motor in a unitary and compact form.

Other objects and advantages of the invention will hereinafter appear.

Figure 1:
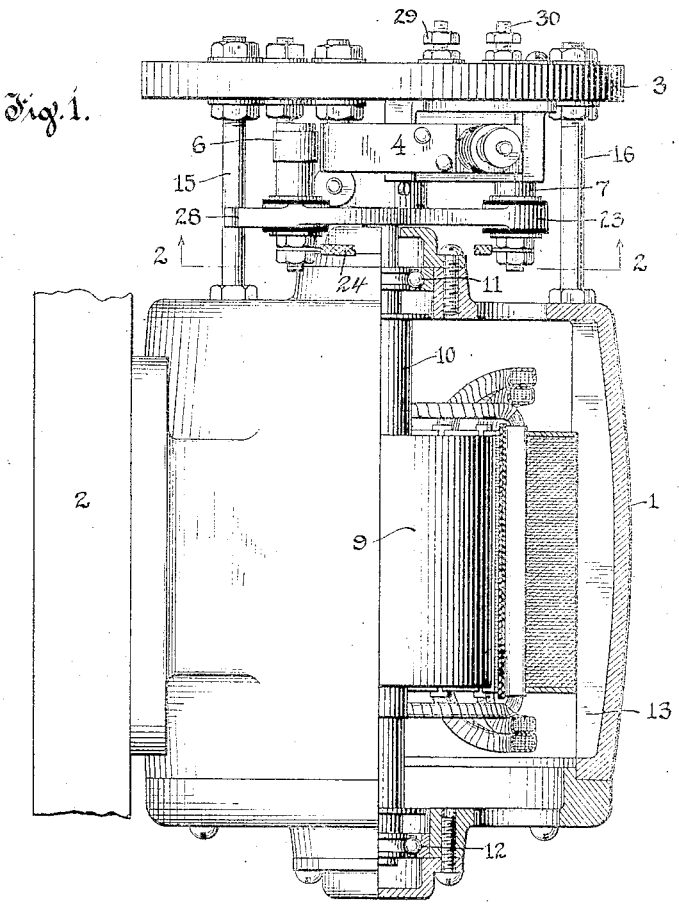
Figure 2:
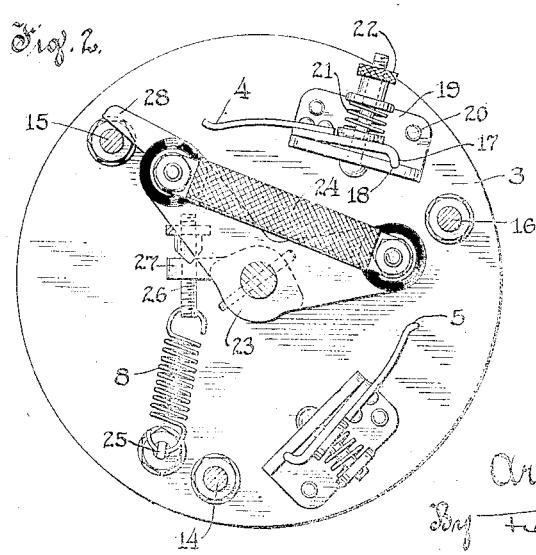

In the accompanying drawing, which illustrates the preferred embodiment of the invention, Figure 1 is a side elevation of the controller partially in section; and, Fig. 2 is a sectional view taken on line 2—2, Fig. 1, but excluding the motor casing.

The controller illustrated comprises a squirrel cage motor 1 secured in a vertical position on a suitable supporting panel 2, a horizontal insulating base 3 arranged above the motor and supported thereon, switch contacts 4 and 5 fixed to said base and cooperating contacts 6 and 7 fixed to the shaft of the motor 1. In use the motor 1 operates against the action of a spring 8 to effect engagement of the contacts and then stalls to maintain engagement thereof while normal conditions prevail. When abnormal conditions occur the motor is rendered inert or its torque so reduced as to permit disengagement of the contacts by the spring 8. Also, the controller embodies adjusting means hereinafter described whereby its sensitiveness is rendered variable both as to limit and range therebetween.

Referring more specifically to the motor, the same is provided with a solid cylindrical rotor 9 fixed to a shaft 10 mounted in ball bearings 11 and 12 provided in the ends of the casing 13 of the motor, said bearings having grease lubrication. Otherwise the motor is of conventional construction. However, the details mentioned and the feature of vertical mounting of the motor are of extreme importance. As will be understood the motor when stalled will generate considerable heat but with the motor mounted vertically as described and provided with ventilating openings in the ends of its casing, the circulation of air between the rotor and stator and around the latter will insure against excessive heating of the motor. On the other hand, the rotor when stalled will always heat up to some extent and, due to its construction, it will transmit its heat to and through the shaft 10 to both bearings 11 and 12 thereof maintaining the lubricant at a suitable working temperature even where the controller is installed in places of low temperature. Thus provision is made for extreme mechanical sensitiveness of the motor.

The insulating switch base 3 is fixed to the motor in a spaced relation therewith by bolts 14, 15 and 16 and as above set forth, the switch contacts 4 and 5 are fixed to said base. Both contacts are of similar construction, each comprising a curved contact strip fixed to a lever 17 having an open bearing 18 on an angle plate 19 fixed to the base, as by rivets 20. Also, each contact has associated therewith a tension device 21 functioning to secure the same in its bearing and to bias it inwardly against its supporting plate which constitutes a stop therefor. Further, the contact 4 has an adjusting nut 22 for its tension device for a purpose hereinafter set forth. The coöperating contacts 6 and 7 comprise studs projecting vertically from a V-shaped supporting member 23 fixed to the shaft 10 of the motor, whereby said contacts make wiping engagement with contacts 4 and 5. Here it is to be noted that the contacts 4 and 5 are so positioned as to be lifted against the action of their tension devices when engaged by contacts 6 and 7, which insures firm engagement thereof and moreover provides for friction of rest variable by the adjustable tension device of contact 4. Also, it is to be noted that contacts 4 and 5 present extensive surfaces for the wiping contacts 6 and 7 and that the former contacts are arranged for progressive engagement by the latter. That is to say, the arrangement is such that contact 6 will engage contact 4 prior to engagement of the other contacts, whereby contact 4 will function to oppose circuit closing operation of the controller to a degree varying with the adjustment of its tension device. However, the curvature of contacts 4 and 5 eliminates this opposition to the motor as soon as the movable contacts pass the tips of the former contacts, said contacts 4 and 5 being curved concentrically with respect to the motor shaft. When the movable contacts have traveled the length of the stationary contacts one of the former abuts the support of one of the latter to stall the motor as above mentioned. The contacts 6 and 7 in this instance serve to bridge the contacts 4 and 5 and to this end the former contacts are connected by a lead 24.

The spring 8 which, as before stated, opposes the operation of the motor, is connected at one end to a lug 25 on the base 3 and at its opposite end to a lug 26 adjustably secured to an extension 27 of the contact carrying member 23. Thus the spring biases the contacts 6 and 7 in a counter-clock-wise direction while the motor when energized moves the contacts in a clockwise direction, the former movement being limited by engagement of a lug 28 on the member 23 with one of the bolts supporting the base 3.

It will now be observed that in order to set the controller in circuit closing position the motor must operate against the combined opposition of the spring 8 and the tensioned contact 4 whereby its sensitiveness in this respect may be varied by adjustment of either or both of the elements opposing the same. On the other hand, in order to move the controller to interrupt circuit the spring 8 must overcome the friction of rest determined by the tension devices of the stationary contacts in addition to the prevailing torque of the motor whereby the sensitiveness of the controller in this respect may be varied by adjustment of the tension device of contact 4 to vary the friction of rest. Consequently it will be apparent that relative adjustment of the devices mentioned will enable variation of the range between the variable limits of sensitiveness whereby the controller may be readily adapted to different requirements of service.

As shown, the contacts of the controller provide a two-point break single pole switch and for its inclusion in circuit binding posts 29 and 30 are provided on the upper side of the insulating base 3, said posts being respectively connected to the supporting plates of contacts 4 and 5. Obviously, however, the contacts might be utilized in other ways.

It is, of course, to be understood that the device illustrated is susceptible of various modifications falling within the scope of the appended claims.

What I claim as new and desire to secure by Letters Patent is:

1. In a circuit controller, in combination, a biased circuit controlling element, a torque motor for operating said element against its bias to a given position and holding the same in said position subject to release upon reduction of the torque of said motor and adjustable means opposing biased movement of said element from said position for variation of its sensitiveness of release upon torque reduction of said motor.

2. A circuit controller, including a biased circuit controlling element movable against its bias to a given position, adjustable means to oppose return movement of said element from said position but only through a limited part of its range of movement and a torque motor operatively connected to said element to move the latter to said position and to hold the same therein but subject to release upon a degree of torque reduction varying with the adjustment of said means.

3. A circuit controller including a biased circuit controlling element, a torque motor for moving said element against its bias to a given position and holding the same in said position but subject to release thereof upon torque reduction and means providing for regulation of the sensitiveness of said element to torque variations of different ranges.

4. In a circuit controller, in combination, a circuit controlling element, a torque motor for moving said element to a given position, means tending to render such movement of said element dependent upon a given torque of said motor and to effect release of said element at a given torque of said motor and means coacting with said former means to render said element sensitive to torque variations of reduced range.

5. In a circuit controller, in combination, a circuit controlling element, a torque motor for moving said element to a given position subject to release thereof upon torque reduction and a plurality of means coacting to provide adjustment of the sensitiveness of said element to positive and negative torque variations.

6. A circuit controller including a switch, a torque motor to operate and hold said switch and separate adjustable means both acting to oppose operation of said switch by said motor and one also acting to oppose reverse operation of said switch.

7. A circuit controller including a switch, a torque motor for operating and holding said switch, means biasing said switch to normal position and adjustable means for varying the friction of rest of said switch when in operated position.

8. A circuit controller including a switch, a torque motor for operating and holding said switch, an adjustable tension device biasing said switch to initial position and means providing variable friction of rest in the controller to oppose biased movement of said switch.

9. A circuit controller including coöperating contacts, a torque motor for effecting and maintaining engagement therebetween and adjustable means to vary the friction between said contacts.

10. A circuit controller including a plurality of successively engageable sets of contacts, a torque motor for effecting engagement of said sets of contacts, means biasing said contacts out of engagement and an adjustable tension device associated with and acting upon a contact of the first engaged set to coact with said biasing means to regulate the sensitiveness of the controller to torque variations.

11. In a circuit controller, in combination, a plurality of successively engageable sets of contacts, a torque motor for effecting and maintaining engagement of said sets of contacts, an adjustable tension device biasing said set of contacts, out of engagement and an adjustable tension device associated with and acting upon a contact of the first engaged set to vary the friction between the contacts of said last mentioned set.

12. A circuit controller including a circuit controlling element, a torque motor for moving said element to a given position and retaining the same therein but subject to release upon torque reduction, said motor having a solid drum rotor and ball bearings therefor, said drum serving to supply the lubricant of said bearings with heat generated by said motor and means to vary the friction of rest of the controller to vary its sensitiveness to torque reduction.

13. In a circuit controller, in combination, a motor, an insulating base fixed to one end of said motor in a spaced relation therewith and switch contacts, certain of the same being fixed to the side of said base contiguous to said motor and another of said contacts being fixed to the shaft of said motor.

14. A circuit controller comprising a torque motor, a contact element fixed to the shaft of said motor to be turned thereby, and relatively stationary contacts to be progressively engaged by said element with a wiping action, and adjustable pressure devices associated with the first engaged contact to vary the friction between the same and said element and a spring associated with said element to bias the same against and/away from said contacts.

15. A circuit controller comprising a torque motor, a contact element fixed to the shaft of said motor to be turned thereby, and relatively stationary contacts to be progressively engaged by said element with a wiping action, an adjustable pressure device associated with the first engaged contact to vary the friction between the same and said element and an adjustable tension device associated with said element to bias the same away from said contacts.

In witness whereof, I have hereunto subscribed my name in the presence of two witnesses.

ARTHUR SIMON.

Witnesses:
HENRY F. VOGT,
OSCAR A. KELLER.